(12) United States Patent
Ohashi et al.

(10) Patent No.: US 7,529,507 B2
(45) Date of Patent: May 5, 2009

(54) CONSTANT-VELOCITY JOINT AND IMAGE FORMING DEVICE

(75) Inventors: Masaaki Ohashi, Toin (JP); Tatsuro Sugiyama, Iwata (JP); Shigeo Kobayashi, Toin (JP); Satoru Fukuzawa, Toin (JP)

(73) Assignee: NTN Corporation, Osaka (JP)

( * ) Notice: Subject to any disclaimer, the term of this patent is extended or adjusted under 35 U.S.C. 154(b) by 213 days.

(21) Appl. No.: 11/406,412

(22) Filed: Apr. 19, 2006

(65) Prior Publication Data

US 2006/0240896 A1   Oct. 26, 2006

(30) Foreign Application Priority Data

| Apr. 21, 2005 | (JP) | ............................... 2005-123443 |
| Jul. 29, 2005 | (JP) | ............................... 2005-220651 |
| Aug. 17, 2005 | (JP) | ............................... 2005-236538 |

(51) Int. Cl.
*G03G 15/00* (2006.01)
(52) U.S. Cl. ..................................................... 399/167
(58) Field of Classification Search ............ 464/8, 464/106, 158, 159, 903, 904; 399/167, 361; 81/177.75; 355/97
See application file for complete search history.

(56) References Cited

U.S. PATENT DOCUMENTS 3,620,043 A * 11/1971 Gantschnigg ................ 464/8

| 5,716,279 | A  | * | 2/1998  | Ham et al. ................... 464/159 |
| 7,289,752 | B2 | * | 10/2007 | Yamazaki et al. ............ 399/167 |
| 7,357,723 | B2 | * | 4/2008  | Ishijima et al. |
| 7,366,443 | B2 | * | 4/2008  | Ohashi et al. ................ 399/167 |

FOREIGN PATENT DOCUMENTS

| JP | 5-172152  | * | 1/1993  | ................ 464/106 |
| JP | 5-341589  |   | 12/1993 |
| JP | 3058213   |   | 4/2000  |

OTHER PUBLICATIONS

Universal Joint and Driveshaft Design Manual, AE-7, The Society of Automotive Engineers, Inc., Warrendale, PA, pp. 99-101, TJ1079. S62 1979.*

* cited by examiner

*Primary Examiner*—Greg Binda
(74) *Attorney, Agent, or Firm*—Wenderoth, Lind & Ponack, L.L.P.

(57) ABSTRACT

A constant-velocity joint includes an outer ring formed with a bore defined by six flat surfaces parallel to its axis, and a trunnion member received in the bore of the outer ring. The trunnion member has an outer periphery formed with three first spherical surfaces circumferentially spaced apart from each other and three second spherical surfaces circumferentially spaced apart from each other and each disposed between adjacent first spherical surfaces. Each first spherical surface is in contact with one of the flat surfaces at a point offset from the circumferential center of the flat surface in one circumferential direction. Each second spherical surface is in contact with another flat surface at a point offset from the circumferential center of the flat surface in the other circumferential direction. At least one of the outer ring and the trunnion member is made of a synthetic resin.

6 Claims, 6 Drawing Sheets

CONSTANT-VELOCITY JOINT AND IMAGE FORMING DEVICE

BACKGROUND OF THE INVENTION

The present invention relates to a constant-velocity joint through which a driving shaft is connected to a driven shaft to transmit torque from the driving shaft to the driven shaft, and an image forming device such as a copier or a laser beam printer (LBP) in which a constant-velocity joint is used.

A known image forming device includes a photoconductor drum which is rotated in one direction. Around the photoconductor drum, an electrifier, an exposure unit, a developing unit and a transfer/electrifier are provided. The electrifier uniformly charges the entire outer periphery of the photoconductor drum. Image light based on image information is thrown onto the thus charged outer periphery of the photoconductor drum by the exposure unit to form an electrostatic latent image thereon. Toner is supplied onto the latent image from the developing unit to form a toner image. The toner image is transferred onto a transfer material being fed at the same speed as the peripheral speed of the photoconductor drum by the transfer/electrifier.

In the case of a monochromatic image forming device, images are formed by a single image forming unit comprising a photoconductor drum, electrifier, exposure unit, developing unit and transfer/electrifier. A full-color image forming device includes four such image forming units that are arranged in tandem in the direction in which transfer materials are fed. The four image forming units form yellow, magenta, cyan blue and black toner images, respectively. By transferring these toner images onto a transfer material, a color image is formed on the transfer material.

In either a monochromatic or a full-color image forming unit, because images are formed by rotating the photoconductor drum or drums, if the photoconductor drum is not rotated at a constant speed, electrostatic images formed on the photoconductor drum by exposure with the exposure unit expand or shrink. Images also expand or shrink when transferring toner images onto a transfer material. Such expansion and shrinkage of images deteriorates the quality of images. It is therefore important to rotate the photoconductor drum at a constant speed.

In a known image forming device, the rotary shaft of a motor is directly connected to the shaft of the photoconductor drum (hereinafter referred to as "drum shaft) to rotate the photoconductor drum. In this arrangement, due to mounting errors when supporting the photoconductor drum and mounting the motor, it is extremely difficult to precisely align the drum shaft and the rotary shaft of the motor. If the drum shaft and the rotary shaft are not aligned with or inclined relative to each other, it is impossible to rotate the photoconductor drum at a constant speed and thus to obtain high-quality images.

In order to solve this problem, JP patent publication 5-341589A proposes to couple the drum shaft to the rotary shaft of the motor through a joint, and to arrange the exposure position and the image transfer position on the photoconductor drum so as to be diametrically opposite to each other. With this arrangement, it is allegedly possible to prevent expansion or shrinkage of images on a transfer material by canceling any expansion or shrinkage of images at the exposure position due to nonuniform rotational speed of the photoconductor drum with the shrinkage or expansion of the images at the transfer position.

But because the joint used in the image forming device disclosed in JP patent publication 5-341589A is a nonconstant-velocity joint, it is impossible to rotate the photoconductor drum at a uniform speed. Thus, even if the exposure position and the transfer position of the photoconductor drum are arranged so as to be diametrically opposite to each other, it is impossible to completely cancel out expansion and shrinkage of images because the diametrically opposed positions tend to shift due e.g. to assembling errors or inclination or deflection of the photoconductor drum, which in turn makes it impossible to form high-quality images.

Another problem is that the input and output members of the non-constant-velocity joint are not easily disassemblable, so that it is troublesome to replace parts of the image forming device such as the photoconductor drum. Maintenance is thus difficult.

Sliding constant-velocity joints are known, which permit angular and axial displacements of the input and output shafts.

For example, JP patent publication 3058213 discloses a constant-velocity joint comprising an outer ring having a central axis and formed with a bore defined by six flat surfaces that are parallel to the central axis and having a hexagonal cross-section, and a trunnion member received in the bore of the outer ring, the trunnion member having an outer periphery formed with three first spherical surfaces circumferentially spaced apart from each other and three second spherical surfaces circumferentially spaced apart from each other and each disposed between adjacent ones of the first spherical surfaces, each of the first spherical surfaces being in contact with one of the flat surfaces at a point offset from a circumferential center of the flat surface in one circumferential direction of the outer ring, each of the second spherical surfaces being in contact with another of the flat surfaces at a point offset from a circumferential center of the flat surface in the other circumferential direction. Torque is thus transmitted between the outer ring and the trunnion member.

This constant-velocity joint comprises a small number of parts, and thus can be made small and lightweight. Because the spherical surfaces of the trunnion member are in sliding contact with and guided by the flat surfaces of the outer ring, angular and/or axial displacement of the outer ring relative to the trunnion member is made smoothly.

The constant-velocity joint disclosed in JP patent publication 3058213 is mainly used for motor vehicles and thus has to have sufficient strength. Its outer ring and trunnion member are therefore both made of a metal such as steel.

Although constant-velocity joints entirely made of a metal have sufficient strength, they are heavy, need lubrication with grease, and produce much noise during operation. Thus, applications of such joints are limited. For example, use of such joints in office machines, audio devices, medical devices and instruments and household appliances will be problematic.

Use of such joints in food processing devices machines is also problematic because in order to prevent foodstuffs from being contaminated with leaked lubricating grease, it is necessary to provide the joints with means for preventing leakage of grease such as a boot. Such means naturally increases the number of parts and the size of the joints and pushes up their cost.

If such a constant-velocity joint is used in an image forming device, the boot has to be mounted and dismounted when assembling and disassembling the joint. This makes maintenance of the image forming device difficult.

An object of the present invention is to provide a constant-velocity joint which needs no grease lubrication, which is lightweight and small in size, which produces less noise during operation, and which can be used for a large variety of machines and devices, and an image-forming device which includes means for rotating the photoconductor drum always at a uniform speed so that high-quality images can be formed, and which is easy in maintenance.

SUMMARY OF THE INVENTION

According to the present invention, there is provided a constant-velocity joint comprising an outer ring having a central axis and formed with a bore defined by six flat surfaces that are parallel to the central axis and having a hexagonal cross-section, and a trunnion member received in the bore of the outer ring, the trunnion member having an outer periphery formed with three first spherical surfaces circumferentially spaced apart from each other and three second spherical surfaces circumferentially spaced apart from each other and each disposed between adjacent ones of the first spherical surfaces, each of the first spherical surfaces being in contact with one of the flat surfaces at a point offset from a circumferential center of the flat surface in one circumferential direction of the outer ring, each of the second spherical surfaces being in contact with another of the flat surfaces at a point offset from a circumferential center of the flat surface in the other circumferential direction, wherein at least one of the outer ring and the trunnion member is made of a synthetic resin.

The synthetic resin is preferably an injection-moldable one so that the outer ring and/or the trunnion member that is made of the synthetic resin can be easily formed.

Also preferably, the synthetic resin is one having lubricity to reduce noise of the constant-velocity joint during operation.

If the outer ring and the trunnion member are made of synthetic resins that are different in base resin from each other, it is possible to prevent adhesion at sliding contact portions of the outer ring and the trunnion member, and to reduce the wear of the two members, thereby keeping isokinetic properties of the joint. The joint according to the invention can thus maintain isokinetic properties for a prolonged period of time and is durable.

With an arrangement in which one of the synthetic resins forming the outer ring and the trunnion member is a resin having lubricity and the other is an engineering plastic other than resins having lubricity, it is possible to improve the mechanical strength of the constant-velocity joint and also improve its isokinetic properties for a prolonged period of time, thereby improving its durability and reduce noise during operation.

Preferably, a preload is applied to the contact points between the flat surfaces of the outer ring and the first and second spherical surfaces of the trunnion member to prevent circumferential chattering, thereby further improving the isokinetic properties of the joint.

From another aspect of the invention, there is provided an image forming device comprising a photoconductor drum having a drum shaft, a driving unit having a driving shaft for rotating the photoconductor drum, an exposure unit for forming an electrostatic latent image on the photoconductor drum, a developing unit for supplying toner to the electrostatic latent image on the photoconductor drum to form a toner image, a transfer unit for transferring the toner image onto a transfer material being fed at the same speed as the peripheral speed of the photoconductor drum, and the above-described constant-velocity joint, the drum shaft and the driving shaft being coupled together through the constant-velocity joint.

For easy maintenance of the image forming device, at least one of the outer ring and the trunnion member is preferably made of a synthetic resin as mentioned above. But in order to simply rotate the photoconductor drum at a uniform speed, the drum shaft of the photoconductor drum and the driving shaft of the driving unit may be coupled together through a constant-velocity joint comprising an outer ring having a central axis and formed with a bore defined by six flat surfaces that are parallel to the central axis and having a hexagonal cross-section, and a trunnion member received in the bore of the outer ring, the trunnion member having an outer periphery formed with three first spherical surfaces circumferentially spaced apart from each other and three second spherical surfaces circumferentially spaced apart from each other and each disposed between adjacent ones of the first spherical surfaces, each of the first spherical surfaces being in contact with one of the flat surfaces at a point offset from a circumferential center of the flat surface in one circumferential direction of the outer ring, each of the second spherical surfaces being in contact with another of the flat surfaces at a point offset from a circumferential center of the flat surface in the other circumferential direction.

Since at least one of the outer ring and the trunnion member is made of a synthetic resin, the constant-velocity joint according to the present invention is lightweight and produces less noise during operation. Since no grease lubrication is necessary, there is no need to mount a boot. The constant-velocity joint according to the invention is thus simple in structure, small in size and lightweight.

Thus, its applications are practically limitless. For example, the constant-velocity joint according to the present invention can be used in office machines, audio devices, medical devices, household appliances and other devices and machines in which it was impossible to use conventional joints. This improves freedom of design of these devices and machines and also makes it possible to reduce the size and cost of these devices and machines.

In the image forming device according to the present invention, since the drum shaft of the photoconductor drum and the driving shaft of the driving unit are coupled together through a constant-velocity joint, the photoconductor drum can be rotated at a uniform speed even if the drum shaft of the photoconductor drum is not in alignment with or inclined relative to the driving shaft of the driving unit.

This prevents shrinkage or expansion of electrostatic latent images formed on the photoconductor drum or shrinkage or expansion of toner images on the photoconductor drum when the toner images are transferred onto a transfer material, thus producing high-quality images.

If the outer ring and the trunnion member of the constant-velocity joint are made of a metal, grease lubrication is necessary. But by forming at least one of the outer ring and the trunnion member from a synthetic resin, no grease lubrication is necessary.

This eliminates the need for a boot for preventing leakage of grease, making it possible to assemble the constant-velocity joint simply by inserting the trunnion member into the bore of the outer ring and disassemble the joint simply by pulling the trunnion member out of the bore of the outer ring. Thus, maintenance of the image forming device is easy. Also, it is possible to completely eliminate the possibility of transfer materials being soiled with leaked grease. The image forming device produces less noise while torque is being transmitted through the constant-velocity joint.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1A:
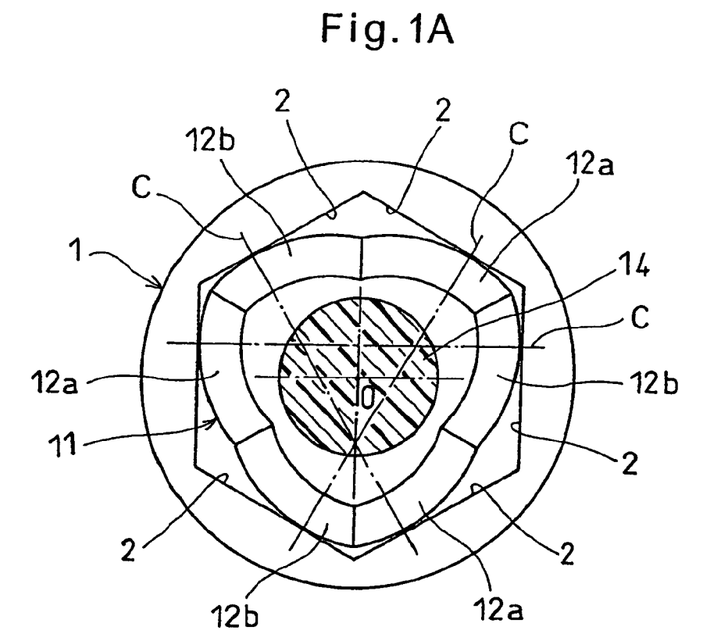
FIG. 1A is a vertical sectional front view of a constant-velocity joint according to the present invention.
Figure 1B:
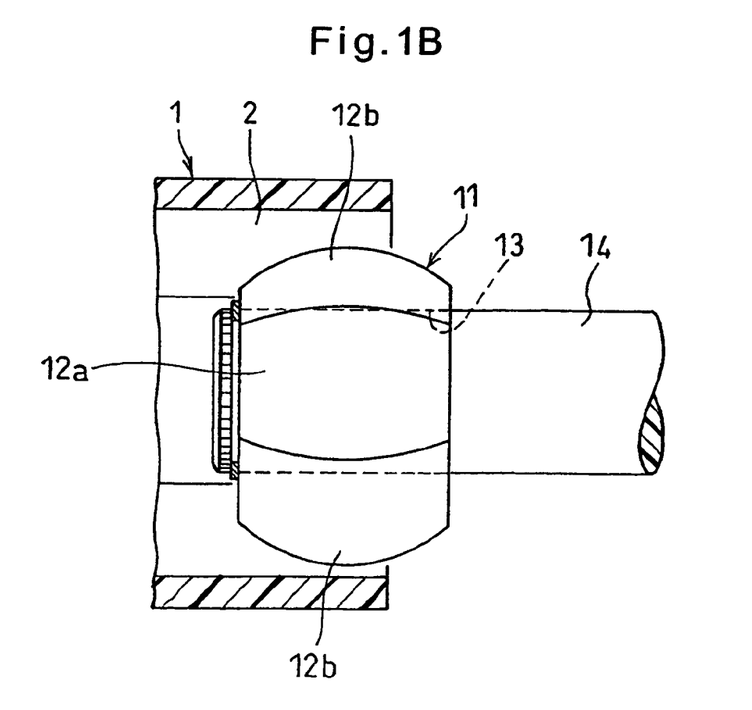
FIG. 1B is a vertical sectional side view of FIG. 1A.

An embodiment of the present invention is now described. As shown in FIGS. 1A and 1B, the constant-velocity joint of the embodiment comprises an outer member 1 and a trunnion member 11. The outer ring 1 is formed with a regular hexagonal bore defined by six flat surfaces 2 that are parallel to the axis of the outer ring 1. The trunnion member 11 is inserted in this bore.

On its outer periphery, the trunnion member 11 has three circumferentially spaced apart first spherical surfaces 12a and three circumferentially spaced apart second spherical surfaces 12b circumferentially alternating with the first spherical surfaces 12a. The first and second spherical surfaces 12a and 12b are kept in contact with the respective flat surfaces 2.

The first spherical surfaces 12a each contact the corresponding flat surface 2 at a point offset in a circumferential direction (clockwise direction in FIG. 1A) from the circumferential center of the flat surface 2. The second spherical surfaces 12b each contact the corresponding flat surface 2 at a point offset in the other circumferential direction (counter-clockwise direction in FIG. 1A) from the circumferential center of the flat surface 2. Each of the first spherical surfaces 12a is arranged such that the distance between the surface 12a and the center O of the joint increases in the clockwise direction. Each of the second spherical surfaces 12b is arranged such that the distance between the surface 12b and the center O of the joint increases in the counterclockwise direction.

Any adjacent first and second spherical surfaces 12a and 12b are circumferentially symmetrical to each other. The contact angle lines C at the contact points between the respective flat surfaces 2 and the corresponding spherical surfaces 12a and 12b intersect with each other inside the joint and define a regular triangle having its center located on the center O of the joint. A shaft 14 is inserted in a through hole 13 formed in the center of the trunnion member 11 and joined to the trunnion member 11 through splines.

With this arrangement, if the shaft 14 rotates clockwise in FIG. 1A, torque is transmitted from the trunnion member 11 to the outer ring 1 through the contact points between the second spherical surfaces 12b and the corresponding flat surfaces 2. If the shaft 14 rotates counterclockwise in FIG. 1A, torque is transmitted from the trunnion member 11 to the outer ring 1 through the contact points between the first spherical surfaces 12a and the corresponding flat surfaces 2.

Figure 2A:
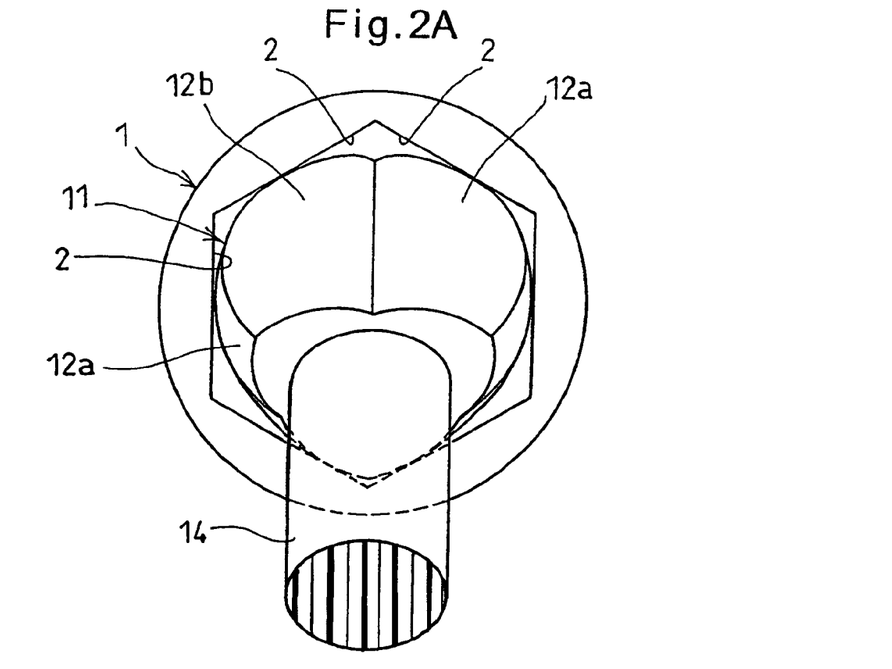
FIG. 2A is a vertical sectional front view of the constant-velocity joint of FIG. 1A, showing a state in which the joint is forming a working angle.
Figure 2B:
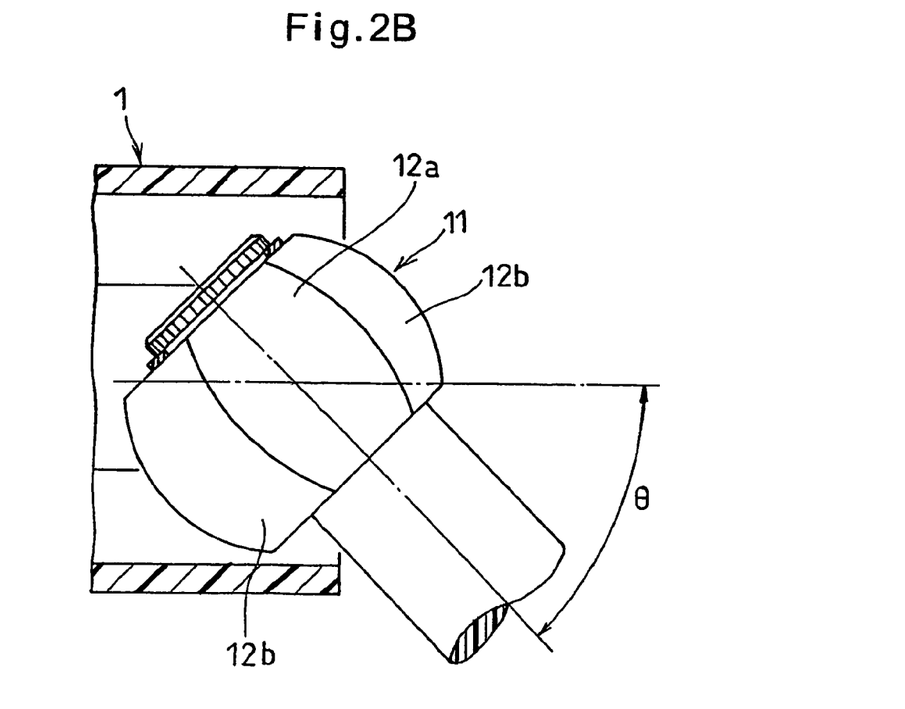
FIG. 2B is a vertical sectional side view of FIG. 2A.

FIGS. 2A and 2B show the constant-velocity joint shown in FIGS. 1A and 1B when the joint forms a working angle, namely when the shaft 14 forms a working angle θ with respect to the outer ring 1. Since the spherical surfaces 12a and 12b of the trunnion member 11 are kept in contact with and guided by the respective flat surfaces 2, the working angle θ can be changed smoothly, and the trunnion member 11 is smoothly movable in the axial direction relative to the outer ring 1, too.

Figure 3A:
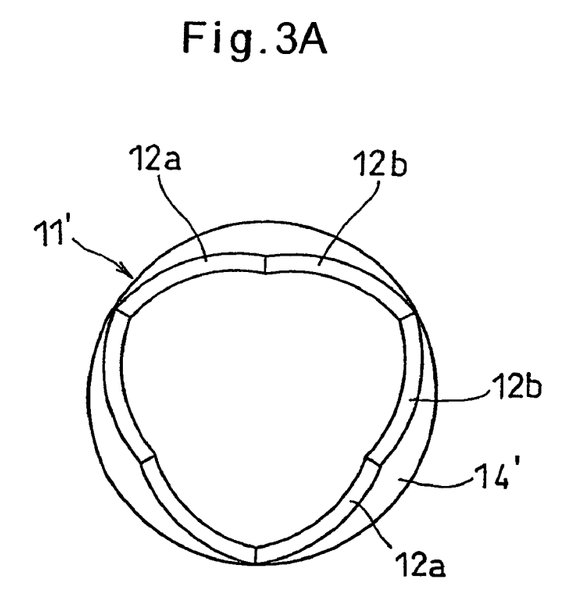
FIG. 3A is a front view of a trunnion member integrally carrying a shaft.
Figure 3B:
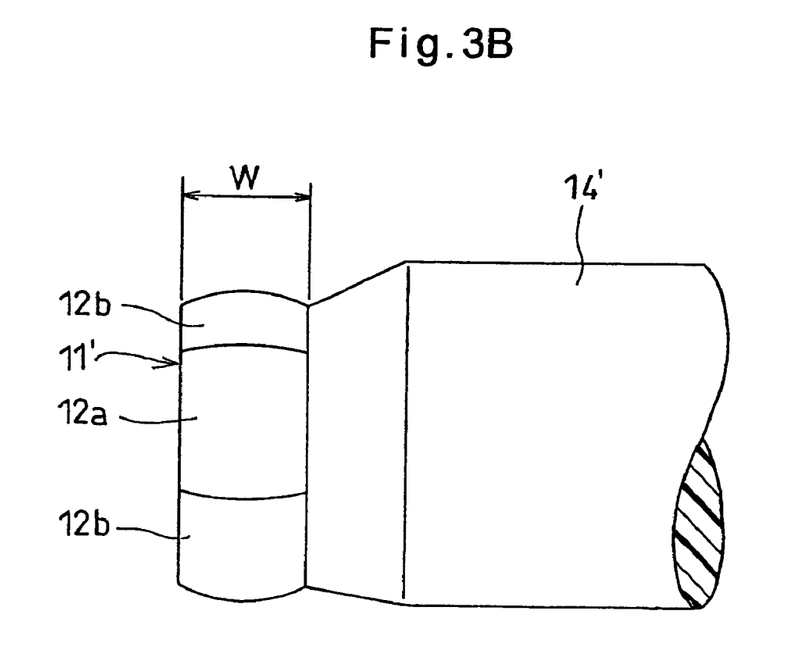
FIG. 3B is a side view of FIG. 3A.

FIGS. 3A and 3B show an embodiment in which the trunnion member 11' and the shaft 14' are integral with each other. The trunnion member 11' has a smaller axial dimension W than the trunnion member 11 of FIGS. 1A and 1B. Thus, this trunnion is more similar in shape to a column and thus smaller in size than the trunnion member of FIGS. 1A and 1B.

Figure 4A:
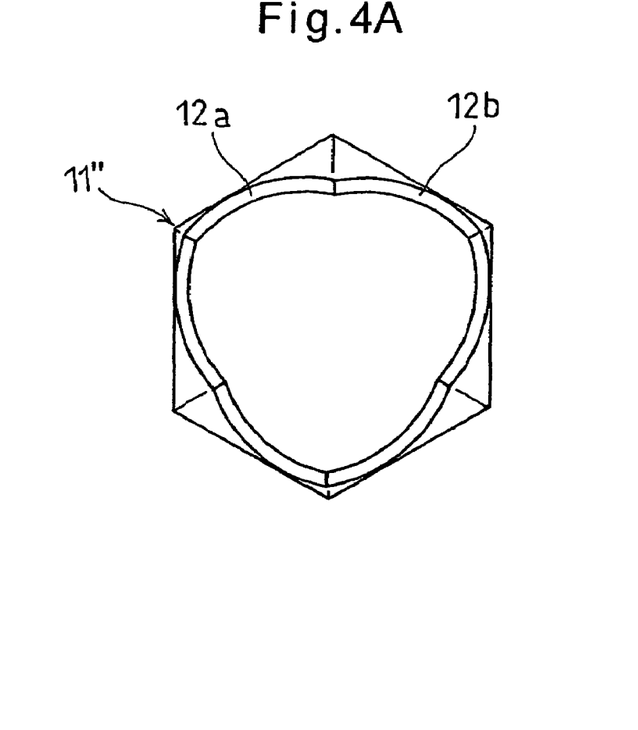
FIG. 4A is a front view of another trunnion member integrally carrying a shaft.
Figure 4B:
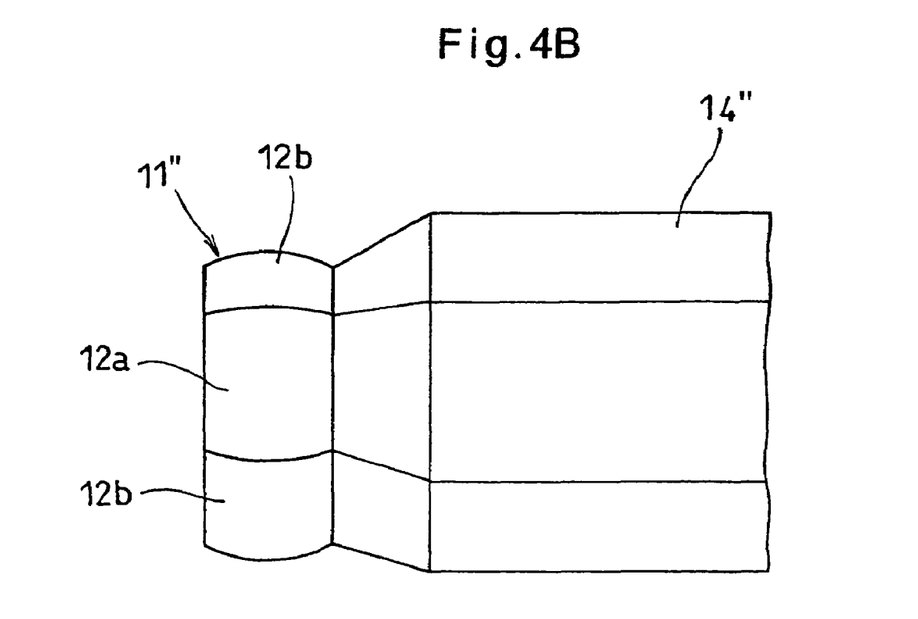
FIG. 4B is a side view of FIG. 4A.

In the embodiment of FIGS. 4A and 4B, too, the trunnion member 11" and the shaft 14" are integral with each other. But this embodiment differs from the embodiment of FIGS. 3A and 3B in that the shaft has a hexagonal cross-section.

The outer ring 1 and the trunnion member 11 are made of a synthetic resin. The type of the synthetic resin used is determined according to the use conditions of the constant-velocity joint, but an injection moldable synthetic resin is preferable. As long as the synthetic resin is an injection moldable one, it may be either a thermoplastic resin or a thermosetting resin.

Injection moldable resins include crystalline ones and amorphous ones. In the present invention, either type is usable. But a crystalline resin is preferable because amorphous resins are low in toughness and tend to break suddenly if subjected to torque higher than a permissible level.

Preferable synthetic resins include synthetic resins having high lubricity, such as polyacetal resin (POM), nylon resin, injection moldable fluororesins including PFA, FEP and ETFE, injection moldable polyimide resin, polyphenylene sulfide resin (PPS), full aromatic polyester resin, polyether-ether ketone resin (PEEK) and polyamide-imide resin.

One of these resins may be used alone or a plurality of them may be mixed together as a polymer alloy. Otherwise, the synthetic resin according to the invention may be a polymer alloy comprising at least one of the above synthetic resins and other synthetic resins that are low in lubricity.

Also, a synthetic resin that is low in lubricity may also be used as the synthetic resin according to the present invention by adding a solid lubricant or lubricating oil thereto. Such a solid lubricant may be polytetrafluoroethylene, graphite or molybdenum disulfide.

To the synthetic resin, glass fibers, carbon fibers or any kind of mineral fibers (whiskers) may be added to increase its strength. A solid lubricant or the like may be further added.

Most preferable synthetic resins usable in the present invention include POM, nylon resins, PPS and PEEK. Preferable nylon resins include nylon 6, nylon 66, nylon 610, nylon 612, nylon 11, nylon 12, nylon 46 and semi-aromatic nylon having an aromatic ring in the molecular chain. POM, nylon resins and PPS have excellent heat resistance and lubricity, and are relatively inexpensive, so that by using these synthetic resins for forming the trunnion member and the outer ring, it is possible to improve the cost performance of the constant-velocity joint.

Use of PEEK, which has excellent mechanical strength and lubricity, will make it possible to obtain a high-performance constant-velocity joint without the need to add reinforcing agents and lubricants.

Thus, by forming the outer ring 1 and the trunnion member 11 from a synthetic resin, a constant-velocity joint is obtained which is lightweight and produces less noise while torque is being transmitted, and which requires no lubrication with grease. Since no lubrication with grease is necessary, there is no need to mount a boot, which leads to a reduction in the number of parts, which in turn simplifies the structure of the constant-velocity joint and reduces its size.

The constant-velocity joint according to the invention can thus be used in various devices and machinery including food processing machines with less restriction of use.

In the embodiment, both the outer ring 1 and the trunnion member 11 are made of a synthetic resin. But only one of the outer ring 1 and the trunnion member 11 may be made of a synthetic resin.

By forming at least one of the outer ring 1 and the trunnion member 11 from a synthetic resin, a preload can be applied at contact points between the flat surfaces 2 and the spherical surfaces 12a and 12b using the elasticity of the synthetic resin. Specifically, the outer ring 1 and the trunnion member 11 may be sized such that the circle including the contact points of the spherical surfaces 12a and 12b with the flat surfaces 2 before the trunnion member 11 is inserted into the outer ring 1 has a diameter greater than the circle including the contact points of the flat surfaces 2 with the spherical surfaces 12a and 12b. With this arrangement, when the trunnion member 11 is inserted into the outer ring 1, a preload is applied at the contact points. The difference in diameter between the abovementioned two circles is preferably not more than 1/100 of the diameter of the latter circle, more preferably 0 to 1/200 for smooth operation of the joint.

A constant-velocity joint according to the present invention, of which the trunnion member 11 was made of a synthetic resin, and a conventional constant-velocity joint, of which the outer ring 1 and the trunnion member 11 were both made of a metal, were prepared and noise was measured when the respective joints were operated. The results are shown in Table 1.

Noise was measured in an anechoic box with each joint spaced apart by 100 mm from a microphone.

In Table 1, for comparison purpose, the weights and costs of the joints are shown, too. The cost of the joint according to the invention is the percentage based on the cost of the conventional joint.

TABLE 1

|  | Noise (dB) | Weight (g) | Cost |
| --- | --- | --- | --- |
| Joint of the invention | 38 | 4.7 | 10 |
| Conventional joint | 60 | 28.2 | 100 |

As will be apparent from Table 1, the joint of the invention produced less noise than the conventional joint and also is lighter in weight and less expensive.

Preferably, the outer ring 1 and the trunnion member 11 are made of synthetic resins which are different in base resin, for example, the outer ring 1 is made of an injection-moldable polyimide resin or PPS, and the trunnion member 11 is made of a full-aromatic polyester resin, PEEK or polyamide-imide resin to prevent adhesion of the two members at their sliding contact portions and to reduce the wear of the two members, thereby keeping isokinetic properties of the joint. The joint according to the invention can thus maintain isokinetic properties for a prolonged period of time and is durable.

Figure 5:
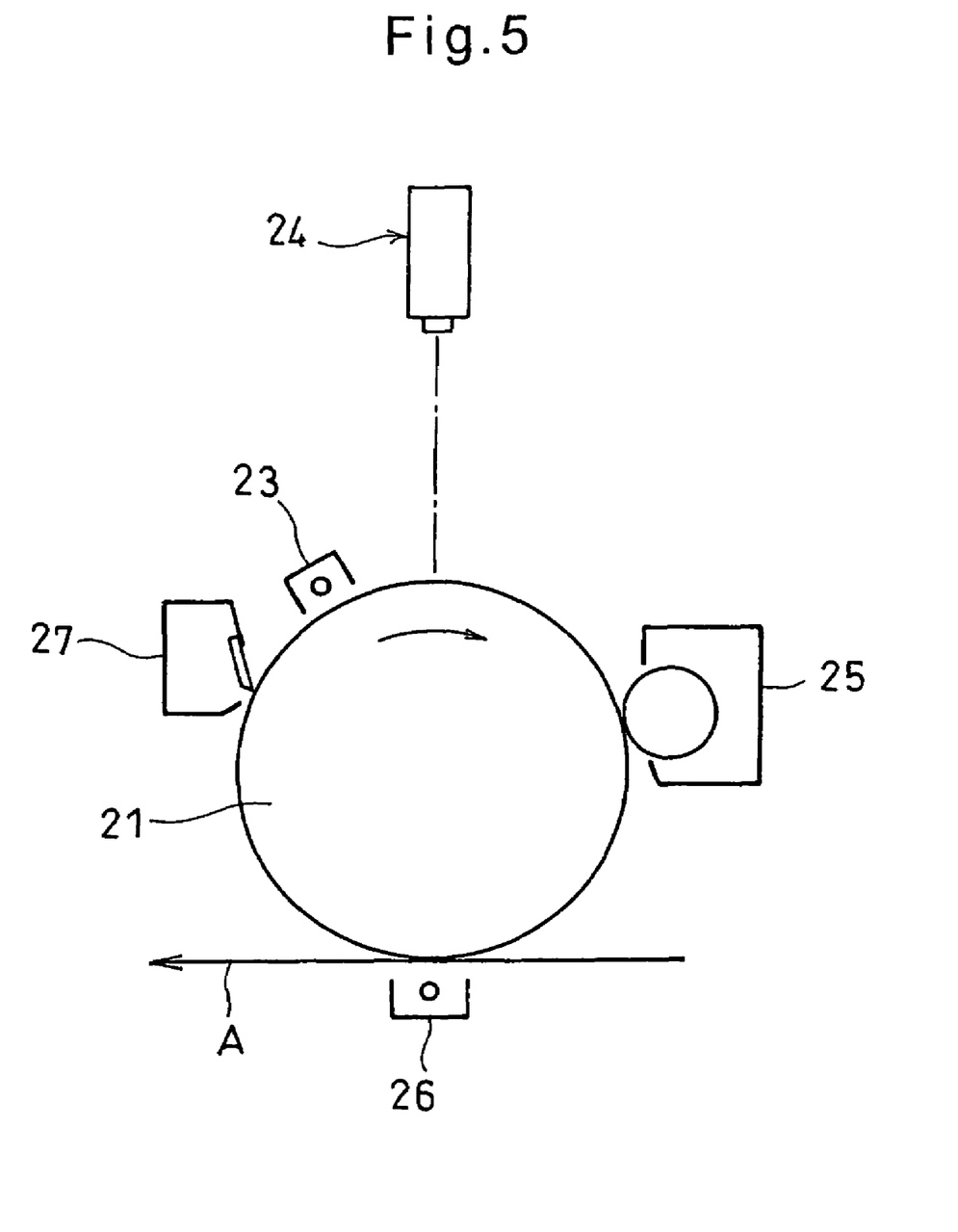
FIG. 5 is a schematic view of an image forming device according to the present invention.

FIG. 5 shows a monochromatic image forming device according to the present invention. This image forming device includes a photoconductor drum 21 which is rotated in the direction of the arrow in FIG. 5 by a driving unit in the form of a driving motor 22 shown in FIG. 6. Around the photoconductor drum 21, an electrifier 23, an exposure unit 24, a developing unit 25, a transfer/electrifier 26 and a cleaner 27 are arranged in this order in the rotational direction of the photoconductor drum 21.

The electrifier 23 uniformly charges the entire outer periphery of the photoconductor drum 21 while the drum 21 is rotating. Image light based on image information is thrown onto the thus charged outer periphery of the photoconductor drum 21 by the exposure unit 24 to form an electrostatic latent image thereon. Toner is supplied onto the latent image from the developing unit 25 to form a toner image. The toner image is transferred by the transfer/electrifier 26 onto a transfer material A being fed at the same speed as the peripheral speed of the photoconductor drum 21. Then, any toner remaining on the outer peripheral surface of the photoconductor drum 21 is removed by the cleaner 27.

Figure 6:
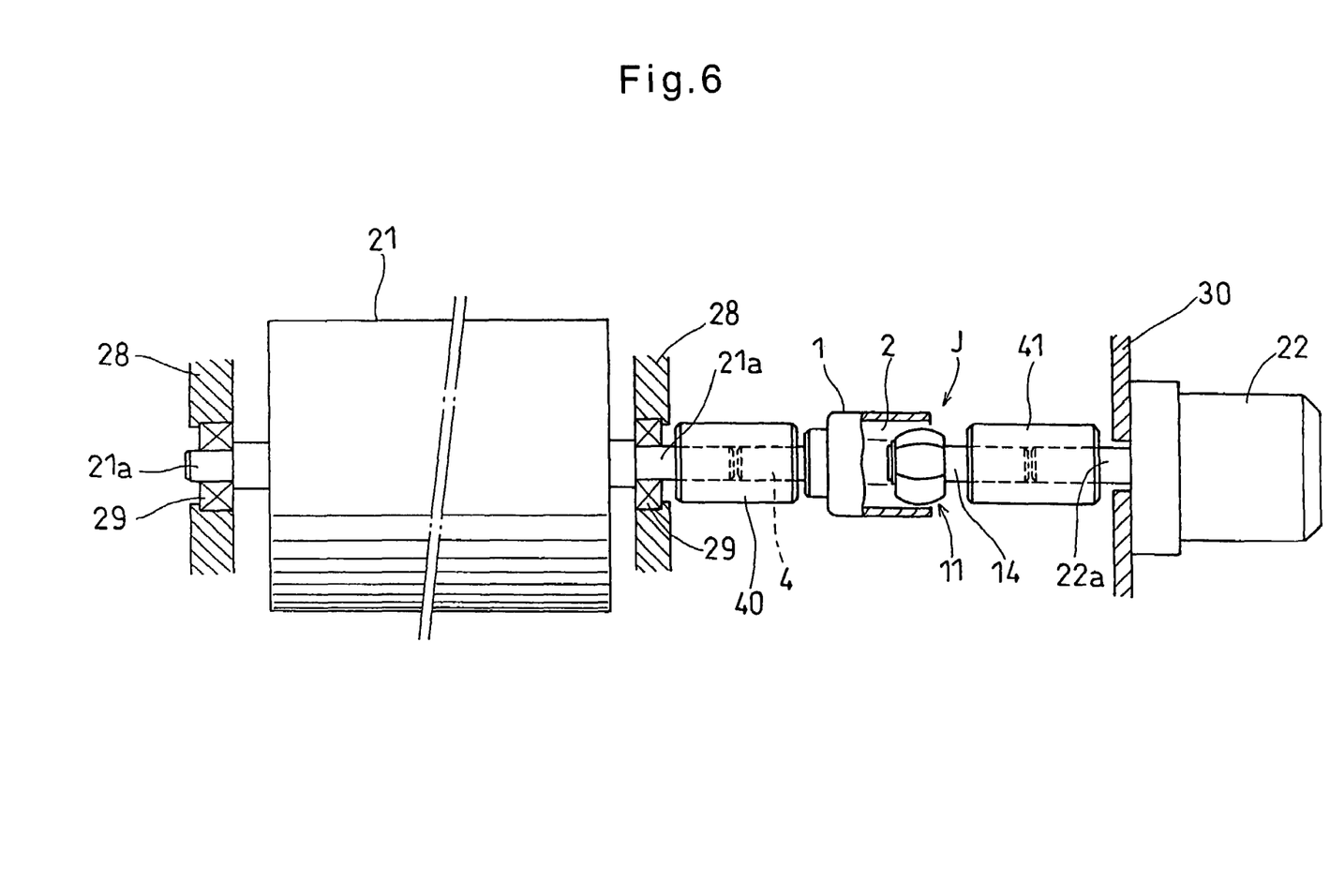
FIG. 6 is a partially cutaway front view of the driving portion for rotating the photoconductor drum of FIG. 5.

As shown in FIG. 6, the photoconductor drum 21 has drum shafts 21a at both ends thereof. Each drum shaft 21a is rotatably supported by one of a pair of side frames 28 through a bearing 29. The driving motor 22 is mounted on a casing 30 so as to axially oppose the photoconductor drum 21.

The driving motor 22 has a rotary (driving) shaft 22a which is coupled to one of the drum shafts 21a through a constant-velocity joint J.

The constant-velocity joint J is the one shown in FIG. 1. The outer ring 1 carries a shaft 3 which is coupled to the one of the drum shafts 21a through a coupling 40. The shaft 14 of the trunnion member 11 is coupled to the rotary shaft 22a of the driving motor 22 through a coupling 41.

Because the drum shaft 21a of the photoconductor drum 21 is coupled to the rotary shaft 22a of the driving motor 22 through the constant-velocity joint J, even if the drum shaft 21a is not in alignment with or inclined relative to the rotary shaft 22a of the driving motor 22, the photoconductor drum 21 can be rotated at a uniform speed.

This prevents any electrostatic latent image formed on the photoconductor drum 21 by the exposure unit 24 from being expanded or shrunk, or any toner image on the photoconductor drum 21 from being expanded or shrunk when transferred onto a transfer material by the transfer/electrifier 26.

Thus, the image forming device according to the present invention can form high-quality images. Since there is no need to provide the exposure unit 24 and the transfer/electrifier 26 so as to be diametrically opposite to each other, freedom of design increases.

Since the constant-velocity joint J requires no lubrication with grease, transfer materials are kept completely free of grease stains.

The constant-velocity joint J can be assembled and disassembled simply by inserting the trunnion member 11 into the bore of the outer ring 1 and pulling the trunnion member 11 out of the bore. Maintenance of the image forming device is thus easy.

While the image forming device shown in FIG. 5 is a monochromatic one, the image forming device according to the present invention may be a full-color image forming device, which comprises four of the image forming devices shown in FIG. 5. The four image forming devices are arranged in tandem in the direction in which transfer materials are fed. The four image forming devices form yellow, magenta, cyan blue and black toner images, respectively. By transferring these toner images onto a transfer material A, a color image is formed on the transfer material.

What is claimed is:

1. A constant-velocity joint comprising:
    an outer ring having a central axis and a hexagonal cross-section, said outer ring formed with a bore defined by six flat surfaces that are parallel to said central axis; and
    a trunnion member configured to be received in said bore of said outer ring, said trunnion member having an outer periphery formed with:
        three first spherical surfaces circumferentially spaced apart from each other; and three second spherical surfaces circumferentially spaced apart from each other and each disposed between adjacent ones of said first spherical surfaces, wherein each of said first spherical surfaces contacts a respective one of said flat surfaces at a point offset from a circumferential center of said one of said flat surfaces in one of two circumferential directions of said outer ring when received in said bore of said outer ring, and wherein each of said second spherical surfaces contacts a respective one of said flat surfaces at a point offset from a circumferential center of said another of said flat surfaces in the other of said two circumferential directions when received in said bore of said outer ring;

wherein the entire outer ring, including said bore, and the entire trunnion member, including said outer periphery, are each made of an injection-moldable synthetic resin.

2. The constant-velocity joint of claim 1, wherein said synthetic resin is a resin having lubricity.

3. The constant-velocity joint of claim 1, wherein said outer ring is made of a first synthetic resin and said trunnion member is made of a second synthetic resin that is different in base resin from said first synthetic resin.

4. The constant-velocity joint of claim 3, wherein one of said first and second synthetic resins is a resin having lubricity and the other of said first and second synthetic resins is an engineering plastic other than resins having lubricity.

5. The constant-velocity joint of claim 1, wherein a preload is applied to contact points between said flat surfaces of said outer ring and said first and second spherical surfaces of said trunnion member.

6. An image forming device comprising:

a photoconductor drum having a drum shaft;

a driving unit having a driving shaft for rotating said photoconductor drum;

an exposure unit for forming an electrostatic latent image on said photoconductor drum;

a developing unit for supplying toner to the electrostatic latent image on said photoconductor drum to form a toner image;

a transfer unit for transferring the toner image onto a transfer material being fed at the same speed as the peripheral speed of said photoconductor drum; and the constant-velocity joint of claim 1, wherein said drum shaft and said driving shaft are coupled together through said constant-velocity joint.

* * * * *